United States Patent
Kimura et al.

(10) Patent No.: US 8,247,040 B2
(45) Date of Patent: Aug. 21, 2012

(54) PROCESS FOR MANUFACTURING PLATINUM TEMPERATURE-MEASURING RESISTANCE ELEMENT

(75) Inventors: Hideo Kimura, Osaka (JP); Kazuya Yoneshita, Osaka (JP); Toru Yamaguchi, Tokyo (JP)

(73) Assignee: Azbil Corporation, Tokyo (JP)

( * ) Notice: Subject to any disclaimer, the term of this patent is extended or adjusted under 35 U.S.C. 154(b) by 463 days.

(21) Appl. No.: 12/600,756

(22) PCT Filed: May 19, 2008

(86) PCT No.: PCT/JP2008/059157
§ 371 (c)(1),
(2), (4) Date: Nov. 18, 2009

(87) PCT Pub. No.: WO2008/143222
PCT Pub. Date: Nov. 27, 2008

(65) Prior Publication Data
US 2010/0151148 A1    Jun. 17, 2010

(30) Foreign Application Priority Data
May 18, 2007 (JP) .................................. 2007-133394

(51) Int. Cl.
*B05D 3/02* (2006.01)
*B05D 3/04* (2006.01)
*B05D 3/06* (2006.01)
*G01K 1/00* (2006.01)
*G01K 7/00* (2006.01)

(52) U.S. Cl. ......... 427/557; 427/377; 427/378; 427/559

(58) Field of Classification Search .................. 374/100, 374/179, 185; 427/125, 372.2, 377, 378, 427/383.1, 543, 545, 546, 557, 559
See application file for complete search history.

(56) References Cited

U.S. PATENT DOCUMENTS 4,050,052 A * 9/1977 Reichelt et al. ............... 338/308
4,719,443 A * 1/1988 Salay ............................ 338/314

FOREIGN PATENT DOCUMENTS

| JP | 63-247630 A | 10/1988 |
| JP | 2517587 B | 10/1988 |
| JP | 02-121302 A | 5/1990 |
| JP | 07-201521 A | 8/1995 |
| JP | 2001-291607 A | 10/2001 |
| JP | 2001-296186 A | 10/2001 |
| JP | 2003-179276 A | 6/2003 |

* cited by examiner

*Primary Examiner* — Michael Cleveland
*Assistant Examiner* — Michael Wieczorek
(74) *Attorney, Agent, or Firm* — McDermott Will & Emery LLP (57) ABSTRACT

The process for manufacturing a platinum temperature-measuring resistance element comprises the step of preparing a thermosensitive part having a portion to be sealed coated with a glaze; the step of placing a pre-sealing element on a tray and inserting the same in a chamber; the step of enclosing a purge gas containing an inert gas and oxygen in the chamber; the step of raising the internal temperature of the chamber to a region in which the platinum is in reduced form at a partial pressure of oxygen in the purge gas as determined from platinum oxide formation free energy; the step of replacing the purge gas with an inert gas wherein oxygen is 1 kPa or below; and the step of under the replaced condition, rapidly heating the furnace interior (interior of the chamber) to a fit melting temperature by means of a lamp heating unit to thereby seal the portion to be sealed of the thermosensitive part.

9 Claims, 8 Drawing Sheets

PROCESS FOR MANUFACTURING PLATINUM TEMPERATURE-MEASURING RESISTANCE ELEMENT

CROSS-REFERENCE TO RELATED APPLICATIONS

This is the U.S. national phase application under 35 U.S.C. §371 of International Patent Application No. PCT/JP2008/059157 filed May 19, 2008, which claims the benefit of Japanese Applications No. 2007-133394, filed on May 18, 2007. The International Application was published in the Japanese language on Nov. 27, 2008 as International Publication No. WO 2008/143222 under PCT Article 21(2). The contents of these applications are incorporated herein in their entirety.

FIELD OF THE INVENTION

The present invention relates to a manufacturing process of a platinum temperature-measuring resistance element having a thermosensitive part comprising platinum resistance wire or platinum resistance film, and more specifically relates to a manufacturing process that can configure a platinum temperature-measuring resistance element having extremely stable characteristics with less resistance value variation by optimizing the oxygen concentration in the purge gas and the process temperature inside the furnace during heat processing conducted inside the furnace.

BACKGROUND OF THE INVENTION

In the past, platinum temperature-measuring resistance elements were commonly parts made by coiling platinum resistance wire into a coil shape and enclosing in an insulator such as ceramic, or by forming platinum resistance film and arranging on glass or the like. Specifically, elements were manufactured by bending coiled platinum resistance wire into a U-shape and then inserting through and drawing out of vertical holes in a cylindrical support member having multiple vertical holes to support a coil-shaped part in vertical holes; and by provisionally stopping the platinum resistance wire by coating one end surface of the support member with glaze, and then after filling the vertical holes with insulating powder, coating the other end of the support member with glaze and heat sealing in a furnace (for example, refer to Japanese Patent No. 2517587, FIG. 2).

Moreover, regarding elements configured by forming a platinum resistance film, a platinum thin film was formed on an aluminum substrate using a sputter or electron beam device, and after coating with resist and masking in a specified pattern, exposing to light and developing, and then removing the unnecessary resist, the platinum thin film other than the pattern was removed by dry etching or wet etching, the platinum resistance film was formed in the specified pattern by removing the resist, and a thin film type platinum temperature-measuring resistance element was obtained by covering the platinum resistance film with a protective film of glass or the like (for example, refer to Japanese Unexamined Patent Publication No. 2003-179276).

When manufacturing these platinum temperature-measuring resistance elements, normally the element is sealed with a glaze or glass frit after annealing the platinum resistance wire or platinum resistance film in a furnace, but in order to prevent contamination of the platinum resistance wire or platinum resistance film, purging is conducted inside the furnace with a mixed gas to which oxygen is intentionally added, for example, argon 85%-oxygen 15%. The small amount of oxygen in this purge gas is present in order to protect the platinum wire or resistance film from contamination, and there is no clear standard for the amount. Nonetheless, this purge gas containing oxygen remains between the aforementioned support member or the platinum resistance film and the protective film when sealing, and variations of resistance value are produced by oxidation of the platinum resistance wire or resistance film.

In the past there was no discussion of the uncertainty of the resistance value caused by this oxidation of platinum, and non-negligible resistance value variations occurred in precision temperature measurements. This is because the mechanisms of quantitative resistance value variation by oxidation-reduction of the platinum resistance wire were not understood, and there was a lack of knowledge about changes of platinum resistance wire caused by the oxygen concentration in the purge gas in the furnace during manufacturing.

Thus, in view of the previously described circumstances, in an attempt at resolution, an object of the present invention is to demonstrate the mechanisms of quantitative resistance value variation by oxidation-reduction of the platinum resistance wire, and to offer a manufacturing process to obtain a stable platinum temperature-measuring resistance element with less resistance value variation in the temperature region of use.

SUMMARY OF THE INVENTION

As a result of assiduous studies related to the present invention in order to resolve the previously described problems, knowledge was obtained regarding the relationship between oxidation potential phase charts and the variations of resistance values of platinum resistance thermometers in which a platinum temperature-measuring resistance element having a thermosensitive part composed of platinum resistance wire is mounted in a protective tube, and based on this the following mechanism was demonstrated regarding quantitative resistance value variation by oxidation-reduction of platinum resistance thermometer resistance wire or platinum resistance film of the platinum temperature-measuring resistance element itself.

Figure 1:
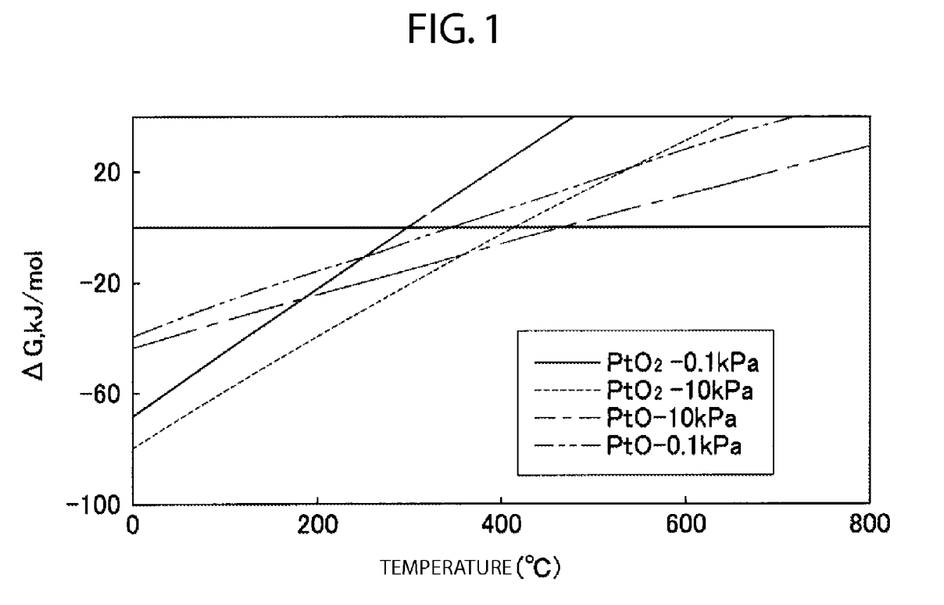
FIG. 1 is an oxidation potential phase chart in which the platinum oxide formation free energies at partial pressures of 0.1 kPa and 10 kPa of oxygen have been calculated.

FIG. 1 is an oxidation potential phase chart relating to the oxidation of platinum, which is calculated by the oxide formation free energy (Gibbs free energy) of the platinum oxides $PtO_2$ and $PtO$ in oxidation reactions when the oxygen partial pressures were 0.1 kPa and 10 kPa. These calculations were made using the Chemical Reaction and Equilibrium Software with Extensive Thermochemical Database, Outokumpu HSC Chemistry for Window, Ver. 5.0. Platinum oxides also include $Pt_3O_4$ and the like, but of this type of platinum oxide may be omitted because the oxide formation free energy is sufficiently larger than that of $PtO_2$ and $PtO$ and has no direct affect on the various of platinum resistance thermometer resistance values. The oxidation potential phase chart of FIG. 1 indicates an energy balance wherein $PtO_2$ is formed in the equilibrium state at a temperature in which the platinum in the oxidation environment is in the vicinity of 300° C., and $PtO$ is formed at a temperature higher than that. These chemical phase transitions demonstrate that the resistance of platinum wire changes at these temperature vicinities. If this oxide film is limited to the surface of the platinum wire, it may be inferred that the resistance change is smaller than the change of resistance value in the equilibrium state. In the past it was said that the oxygen in the purge gas that is sealed in the sheath of the platinum resistance thermometer is necessary to protect the platinum wire from contamination by other metallic impurities, and oxygen with a partial pressure of about 5 kPa at room temperature was put into the platinum resistance thermometer sheath. According to the oxidation potential phase chart in FIG. 1, $PtO_2$ in the equilibrium state at room temperature changes to PtO at 300° C. to 450° C., and is reduced to platinum and oxygen at temperatures above that. The characteristics of the equilibrium state of the aggregate of platinum and oxygen are determined by the oxide formation free energy, and the oxide formation free energy is determined by the temperature t and the oxygen partial pressure p. The partial pressure of oxygen within the platinum resistance thermometer is normally adjusted to approximately 10 kPa or less, and the oxidation characteristics of most platinum resistance thermometers are between the two partial pressure lines in this chart.

The $PtO_2$ chemical reaction is indicated in equation (1) below. Moreover, the oxide formation free energy $\Delta G_{PtO2}(T,p)$ of this reaction is expressed by equation (2) below. Here, p is the oxygen partial pressure; $K_{PtO2}(T)$ is the chemical equilibrium constant at temperature T; and R is the gas constant. This equation indicates that $PtO_2$ is stable in the temperature region of $\Delta G_{PtO2}(T,p)<0$, and that as long as oxygen is supplied, the chemical reaction always advances to the right in reaction equation (1). Moreover, at approximately 400° C. or more, there is another phase transition, and the chemical reaction of PtO is indicated in equation (3) below. The oxide formation free energy $\Delta G_{PtO}(T,p)$ of this reaction is expressed by equation (4) below. This reaction also depends on the partial pressure p and the temperature T. The direction of this reaction is also determined by the the sign of $\Delta G_{PtO}(T,p)$. At approximately 500° C. or more, $\Delta G_{PtO}(T,p)$ becomes >0, and PTO decomposes into Pt and $O_2$.

$$Pt+O_2=PtO_2 \quad (1)$$

$$\Delta G_{PtO2}(T,p)=-RT\ln(K_{PtO2}(T)/p) \quad (2)$$

$$Pt+\tfrac{1}{2}O_2=PtO \quad (3)$$

$$\Delta G_{PtO}(T,p)=-RT\ln(K_{PtO}(T)/p^{1/2}) \quad (4)$$

Moreover, at 300° C. or less, the above reactions are determined by the sizes of $\Delta G_{PtO2}(T,p)$ and $\Delta G_{PtO}(T,p)$, and if $\Delta G_{PtO2}(T,p)$ is smaller than $\Delta G_{PtO}(T,p)$, then $PtO_2$ is stable. Therefore, PtO is stable in the narrow temperature region in the vicinity of 400° C. Specifically, only in the temperature region from the part that crosses the $PtO_2$ line in FIG. 1 to $\Delta G_{PtO}(T,p)=0$.

In the equilibrium state, enclosing approximately 10 kPa of oxygen gas should contribute to a resistance value increase of about 1/10K, but because the velocity of equilibration is extremely slow at room temperature and it may be inferred that an oxide film on the surface of the platinum wire limits diffusion of oxidation to the interior, the actual increase in resistance value does not reach the resistance value in the equilibrium state. Nonetheless, the platinum oxide increases over time and is measured as resistance value drift. Moreover, this oxide reaction velocity becomes faster at high temperatures. Therefore, resistance value drift causes inaccuracy when taking precise measurements, specifically, the measurements must be considered inaccurate at 300° C. or more.

The oxide formation free energy indicated in FIG. 1 indicates that the oxidation-reduction reactions of platinum are controlled depending on the oxygen partial pressure and the temperature. Phase change occurs at the point where the two curves of a given partial pressure cross, and if the platinum resistance thermometer is in the equilibrium state, resistance change may be inferred based on these curves. The present inventors conducted experiments to investigate the characteristics (resistance value changes) of oxidation-reduction of platinum wire caused by oxygen in the purge gas, and confirmed by actual measurements when not in the equilibrium state that oxidation-reduction reactions are generated following the oxide formation free energy lines in the oxidation potential phase chart of FIG. 1, and that the resistance value of the platinum resistance thermometer changes.

Figure 13:
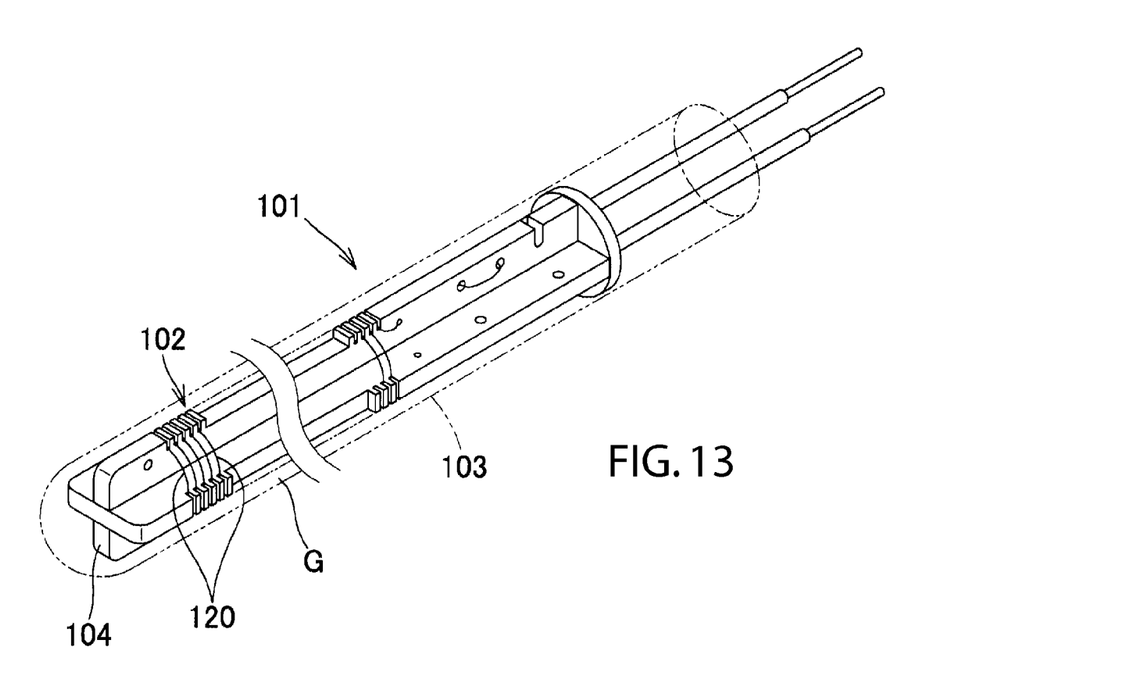
FIG. 13 is an explanatory diagram indicating a platinum resistance thermometer used in Experiments 1 to 3 that refer to the present invention.

The platinum resistance thermometer actually used in the experiment was the same as the conventional platinum resistance thermometer indicated in FIG. 13, which had a structure in which platinum wire was wound in a single coil shape on a quartz reel in a quartz sheath, and which was modified so that the oxygen partial pressure in the sheath could be adjusted. Three platinum resistance thermometers were used in the experiment, and these were maintained at a temperature of 600° C. or more for approximately 10 hours to cause reduction of the platinum wire in the thermosensitive part. The partial pressures of the oxygen in the purge gas of the respective platinum resistance thermometers were set at roughly 2 kPa (Y002), 2 kPa (Y003), and roughly 8 kPa (S4742); these were heated from 16 to 24 hours at suitable temperatures from 200° C. to 500° C., and 600° C.; and the resistance value at the triple point of water was measured every 8 hours.

Figure 2:
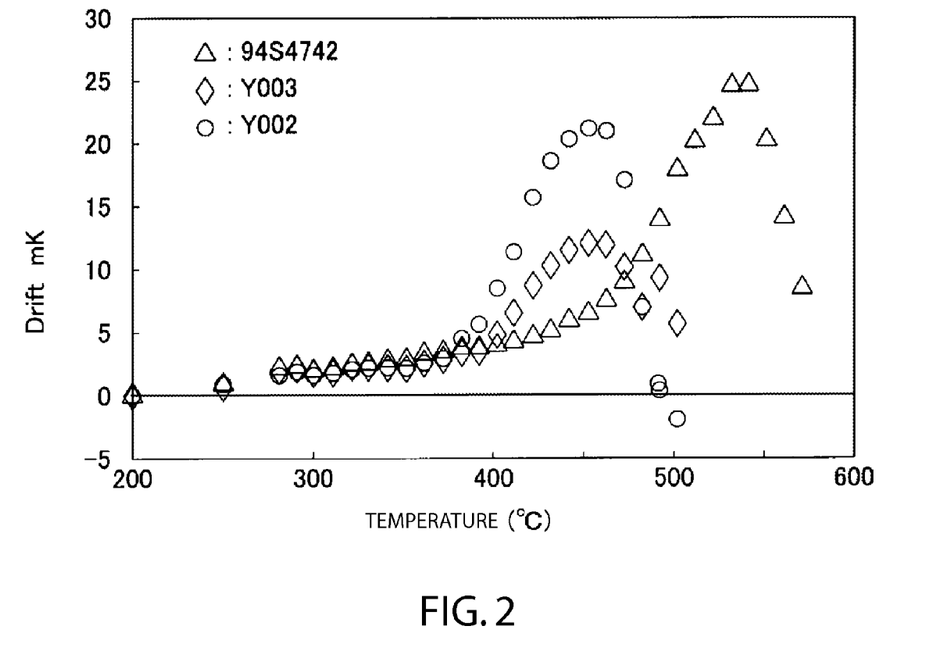
FIG. 2 is a graph of measurements of the amount of resistance value drift of platinum resistance thermometers with resistance caused by oxidation-reduction at a given temperature.

FIG. 2 is a graph of measurements of the amount of drift of the resistance values (not the heat equilibrium state) of platinum resistance thermometers caused by oxidation-reduction at a given temperature for each platinum resistance thermometer, and the transverse axis indicates the exposure temperature while the longitudinal axis is the temperature-converted value of the change of resistance value from when reduced. It was demonstrated that the resistance value separated into two phases at a temperature of approximately 350° C. to 400° C., and that the phase transitioned from $PtO_2$ to PtO. Specifically, when an oxidation potential phase chart like that of FIG. 1 is plotted, the oxygen partial pressures of the various platinum resistance thermometers at the two oxidation phases of platinum correspond to both sides of the intersection point of the two intersecting curves. Moreover, it was demonstrated that the resistance value decreased at approximately 450° C. to 530° C., and the phase transitioned from PtO to Pt. When an oxidation potential phase chart like that of FIG. 1 is plotted in the same way, the oxygen partial pressures of the various platinum resistance thermometers correspond to both sides of the intersection point of the PtO curve and the energy 0 line. According to FIG. 2, there two steps in the resistance change of the various platinum resistance thermometers, and the characteristic difference between these platinum resistance thermometers is mainly the oxygen partial pressure.

These experiments confirm that even in the actual measurement environment, which is not an equilibrium state, platinum reacts with oxygen in accordance with the oxidation potential phase chart in FIG. 1. Specifically, it was confirmed that the reaction from platinum to $PtO_2$, from $PtO_2$ to PtO, and from PtO to Pt occur following the oxide formation free energy lines of FIG. 1, and the characteristics of resistance value variations are affected by the oxygen partial pressure in the sheath. The reasons that the resistance value increases appear to be that the number of conduction electrons of the platinum is decreased by $PtO_2$ chemically changing to 2PtO, and that the temperature increase causes acceleration of the chemical change.

Figure 3:
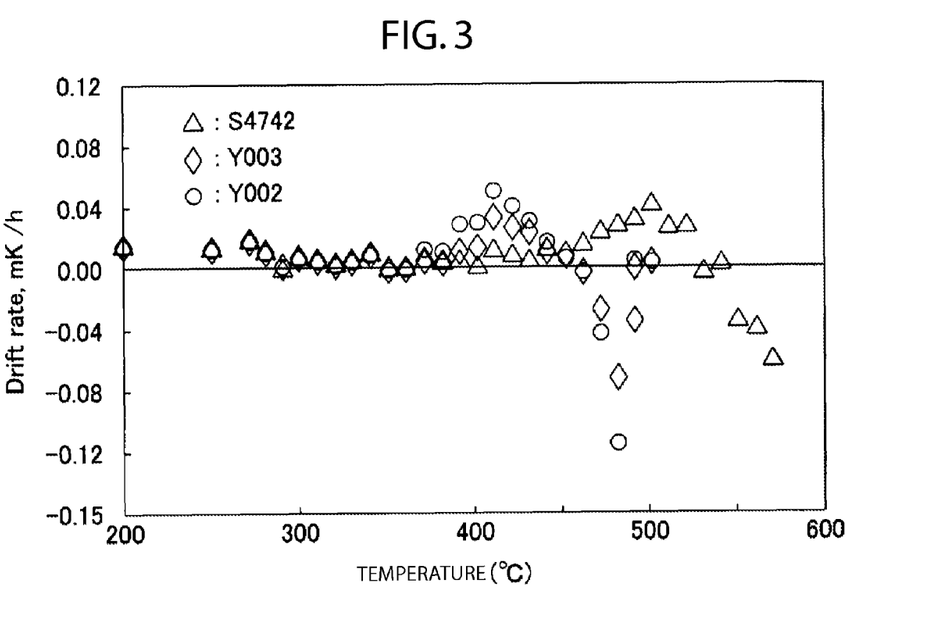
FIG. 3 is a graph indicating the amount of initial drift variation caused by oxidation-reduction at 200° C. to 570° C.

FIG. 3 indicates the change of initial drift caused by the oxidation-reduction from 200° C. to 570° C. that was experimentally obtained, and the longitudinal axis indicates the standard uncertainty of the drift rate at specific temperatures. The drift rate is slow in the $PtO_2$ region and is fast in the PtO region. Therefore it appears that the oxidation in the PtO temperature region is faster than in the $PtO_2$ temperature region. Moreover, the chart indicates that oxidation is already progressing even at 200° C. or less.

Based on the findings that the oxygen in the purge gas and the platinum wire in the platinum resistance thermometer react according to the oxidation potential phase chart of platinum as described above and that the characteristics of the resistance value variations are determined by the partial pressure of the oxygen in the purge gas, the present inventors discovered as a result of repeated experiments and studies under various conditions that, when manufacturing a platinum temperature-measuring resistance element by sealing the thermosensitive part composed of platinum resistance wire or platinum resistance film with a sealing material, a platinum resistance thermometer extremely stable across the entire temperature region can be realized by annealing in the furnace prior to sealing by raising the internal temperature of the thermosensitive part up to the reduction temperature of platinum, substituting the purge gas in the furnace with inert gas in which the partial pressure of oxygen 1 kPa or less, and sealing; and further discovered that a stable element with less resistance value variation could be realized by causing sufficient oxidation of the surface of the platinum into $PtO_2$, in which case, if at a partial pressure at which the amount of oxygen of the atmospheric gas in the furnace during sealing becomes the above $PtO_2$ oxidized form in the temperature region of use, a platinum temperature-measuring resistance element can be realized, which can be used stably in the applicable temperature region of use without necessarily restricting the partial pressure to 1 kPa. Thus, the present invention was perfected.

Specifically, the present invention offers a process for manufacturing a platinum temperature-measuring resistance element configured by sealing with a sealing material a thermosensitive part composed of platinum resistance wire or platinum resistance film, wherein after the temperature of the unsealed thermosensitive part composed of platinum resistance wire or platinum resistance film is raised inside a furnace purged with inert gas containing oxygen to the temperature region in which the platinum is in reduced form at a partial pressure of oxygen in the applicable purge gas as determined from platinum oxide formation free energy, the aforementioned purge gas in the furnace is substituted with inert gas in which oxygen is 1 kPa or less, the aforementioned thermosensitive part is sealed in that state and can be stably used to the temperature region of the reduced form of platinum in which the partial pressure of the aforementioned oxygen is 1 kPa or less as determined by the platinum oxide formation free energy. Further, in the present application, the oxygen partial pressure of the purge gas is the partial pressure at room temperature.

Moreover, the present invention offers a process for manufacturing a platinum temperature-measuring resistance element having a thermosensitive part composed of platinum resistance wire or platinum resistance film, wherein after the temperature of the thermosensitive part composed of platinum resistance wire or platinum resistance film is raised inside a furnace purged with inert gas containing oxygen to the temperature region in which the platinum is in reduced form at a partial pressure of oxygen in the applicable purge gas as determined from platinum oxide formation free energy, the aforementioned purge gas in the furnace is substituted with inert gas in which oxygen is 1 kPa or less; and in that state, after the temperature inside the furnace has been decreased to the temperature region in which $PtO_2$ is in oxidized form at a partial pressure of oxygen in the purge gas of 1 kPa or less, gas containing oxygen is taken as the purge gas in the furnace and the surface of the platinum resistance wire or platinum resistance film of the aforementioned thermosensitive part is sufficiently oxidized with $PtO_2$.

Here, after the surface of the platinum resistance wire or platinum resistance film of the aforementioned thermosensitive part has been sufficiently oxidized with $PtO_2$, preferably, stable use in the use temperature region of the aforementioned oxidized form of $PtO_2$ is made possible by sealing the aforementioned thermosensitive part when the purge gas in the furnace is further substituted with gas having a oxygen partial pressure such that the use temperature region of the applicable platinum temperature-measuring resistance element falls within the temperature region of the aforementioned oxidized form of $PtO_2$.

In order to cause $PtO_2$ oxidation of the surface of platinum resistance wire or platinum resistance film of the aforementioned thermosensitive part, preferably, the aforementioned gas containing oxygen is gas with 100% oxygen.

Moreover, preferably, the temperature region of the aforementioned reduced form of platinum and the temperature region of the aforementioned $PtO_2$ form are determined using a phase chart of platinum based on the respective oxide formation free energies.

Further, preferably the aforementioned inert gas with oxygen of 1 kPa or less to be substituted in the furnace is an inert gas containing roughly 0% or trace amounts of oxygen.

More concretely, preferably the specified highly pure inert gas that has been passed through an oxygen getter is used for the aforementioned inert gas with roughly 0% oxygen.

The present invention also offers a platinum temperature-measuring resistance element manufactured by the above manufacturing process.

The temperature of the unsealed thermosensitive part composed of platinum resistance wire or platinum resistance film is raised inside a furnace purged with inert gas containing oxygen to the temperature region in which the platinum is in reduced form at a partial pressure of oxygen in the applicable purge gas as determined from platinum oxide formation free energy thereby conducting residual strain relief annealing that increases the purity (resistance ratio) of the platinum resistance wire and the like in a clean high temperature atmosphere containing oxygen, and, once a substrate with a stable resistance value has been made, the aforementioned purge gas in the furnace is substituted with an inert gas in which the oxygen partial pressure is 1 kPa or less and the aforementioned thermosensitive part is sealed in that state; therefore, the invention of the present application described above can have stable characteristics with less resistance variation irrespective of temperature by making the oxygen partial pressure of the gas remaining in the sealed thermosensitive part be 1 kPa or less.

Or, without sealing, in the state with the purge gas in the furnace substituted with inert gas in which the oxygen partial pressure is 1 kPa or less, the temperature inside the furnace is decreased to the temperature region in which $PtO_2$ is in oxidized form at a partial pressure of oxygen in the purge gas of 1 kPa or less as determined by the oxide formation free energy, gas containing oxygen is taken as the purge gas in the furnace, and the surface of the platinum resistance wire or platinum resistance film of the aforementioned thermosensitive part is sufficiently oxidized with $PtO_2$; and therefore stable characteristics with less resistance variation can be obtained whether or not final sealing is conducted.

In particular, by causing sufficient $PtO_2$ oxidation of the surface of the platinum resistance wire or platinum resistance film of the aforementioned thermosensitive part, and then sealing the aforementioned thermosensitive part when the purge gas inside the furnace has been substituted with a gas having partial pressure such that the use temperature region of the applicable platinum temperature-measuring resistance element falls within the temperature region of the aforementioned oxidation form of $PtO_2$, a platinum temperature-measuring resistance element can be offered that can be stably used in the temperature region of use of the aforementioned oxidized form of $PtO_2$.

Moreover, the temperature region of the reduced form of platinum and the temperature region of the $PtO_2$ form can be effectively determined using the platinum oxidation potential phase chart based on the respective oxide formation free energies.

More preferably, by taking an inert gas with roughly 0% or trace amounts (partial pressure of about 10 Pa or less) of oxygen as the inert gas to be substituted in which oxygen is 1 kPa or less, a platinum resistance thermometer with a more stable resistance value can be offered when sealing the thermosensitive part with the applicable substitution gas. In the above cases in which further oxidation is conducted without sealing, the oxidation reaction speed is suppressed in the PtO region when lowering the temperature to the oxidation temperature, and therefore the production of PtO is suppressed and oxidation as pure $PtO_2$ can be conducted, which can stabilize the resistance value.

Moreover, inert gas with roughly 0% oxygen can be effectively obtained by further passing highly pure inert gas containing 0.2 ppm to several ppm of oxygen through an oxygen getter such as a titanium sponge.

DETAILED DESCRIPTION OF THE INVENTION

Next, embodiments of the present invention will be explained in detail based on the attached drawings.

Figure 11:
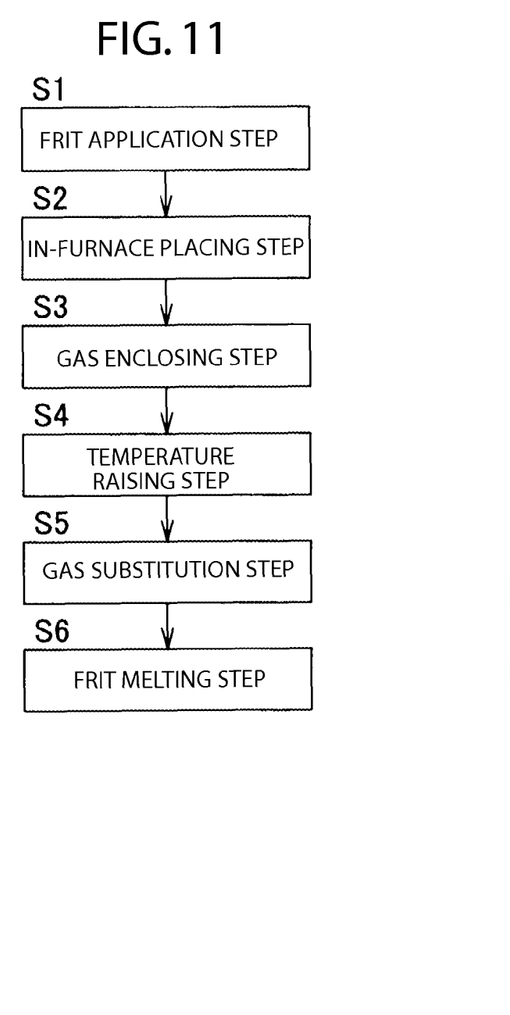
FIG. 11 is a flowchart indicating the order of manufacturing the first embodiment.
Figure 12:
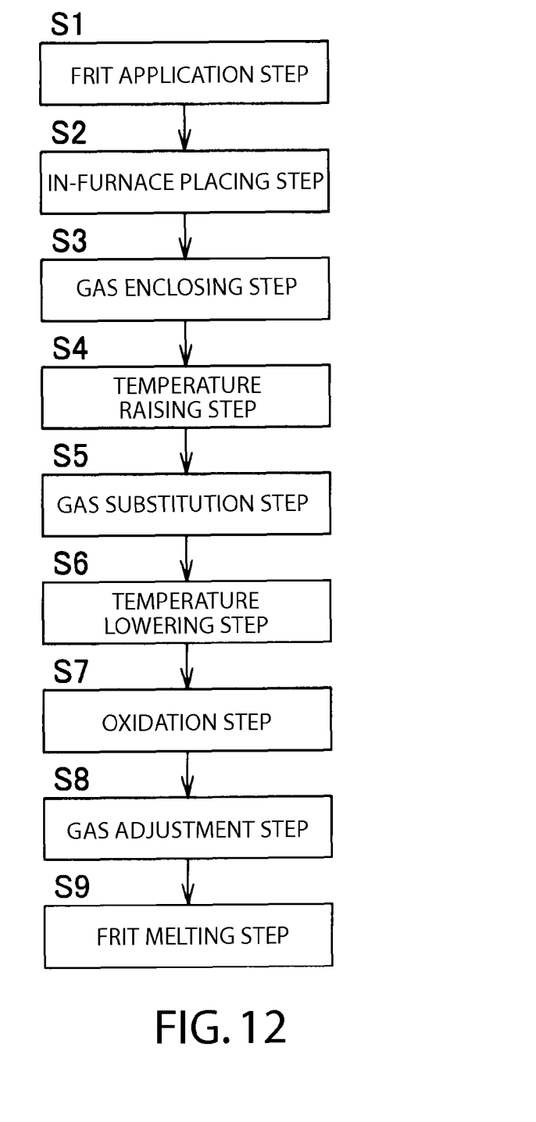
FIG. 12 is a flowchart indicating the order of manufacturing the second embodiment.

FIG. 11 is a step chart indicating the order of manufacturing an embodiment; FIG. 12 is a step chart indicating the order of manufacturing another embodiment; FIG. 13 indicates the structure of the platinum resistance thermometer used in Experiments 1 to 3; and FIG. 14 indicates an example of a heating furnace capable of gas purging (chamber mount type) used in the present embodiment. As long as the platinum temperature-measuring resistance element of the present invention has a thermosensitive part composed of platinum resistance wire or platinum resistance film, any structure is allowable, and a broad range of the materials used in the past may be applied to the materials of the structural members (retention member, substrate, frit, and the like). Moreover, the inert gas used in the purge gas in the chamber is not particularly limited, and argon, nitrogen, helium, neon or the like may be used.

Figure 14:
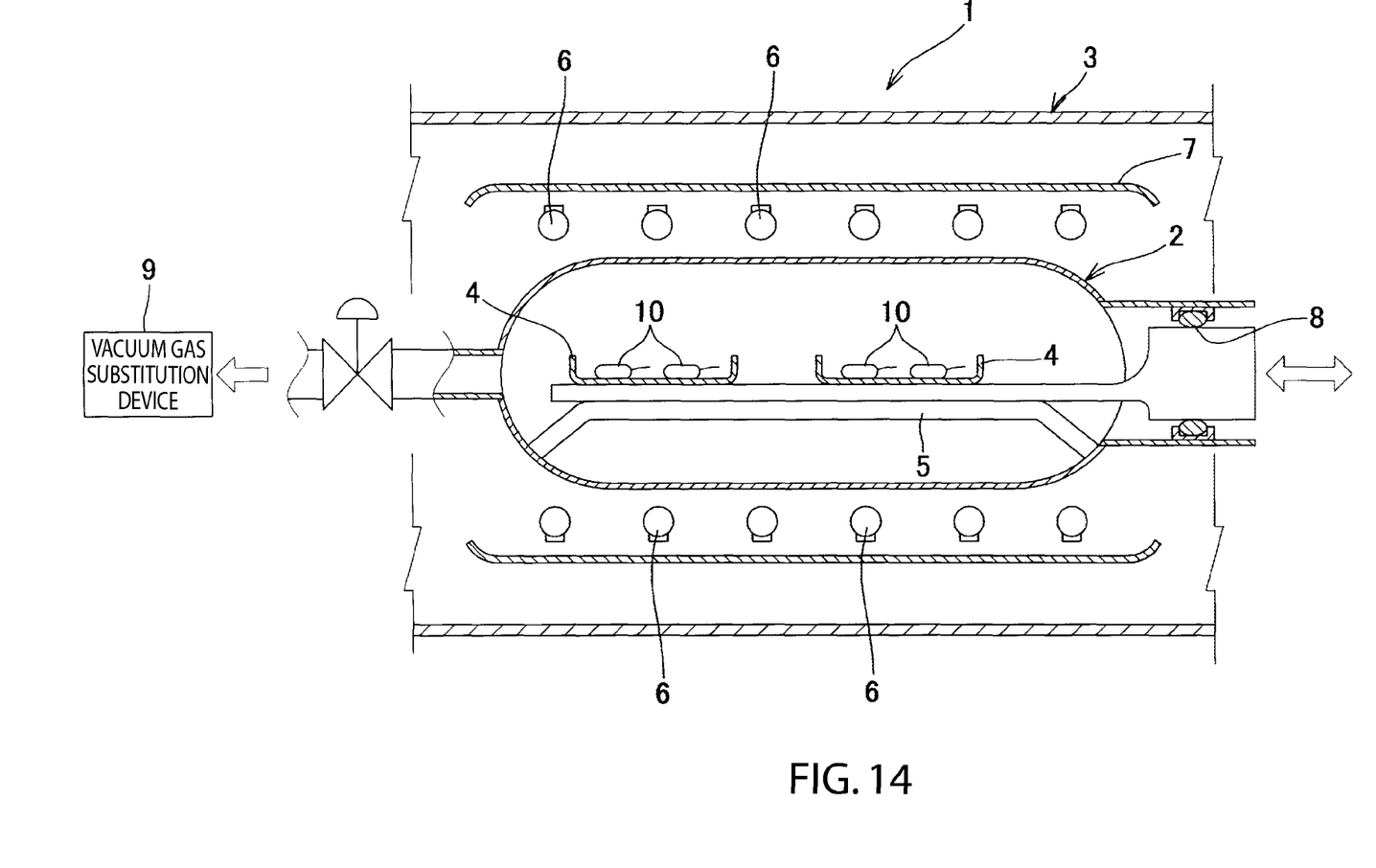
FIG. 14 is an explanatory diagram indicating an example of a heating furnace capable of gas purging (chamber mount type).

First, the process of manufacturing the platinum temperature-measuring resistance element related to an embodiment will be explained based on FIG. 11 and FIG. 14. As indicated in FIG. 14, a chamber mounted type heating furnace 1 is configured by a furnace unit 3 provided with: a clear quartz chamber 2, which is connected to a vacuum and gas substitution device 9, and in which the oxygen concentration (partial pressure) can be adjusted; a clear quartz tray 4, which is guided by a susceptor (guide) arranged in the interior thereof, and which is mounted in a manner capable of being brought in and out of the chamber; and lamp heating devices 6 mounted in the chamber 2. The output of the lamp heating devices 6 can be adjusted to vary the forms of increasing and decreasing the temperature such as rapid heating and gradual cooling. Sealing can be conducted by placing the elements prior to heat fusion of the frit on the tray 4, mounting in chamber 2, and heating with the lamp heating devices 6.

Further, as indicated in FIG. 14, an example configured by a chamber is indicated in this embodiment, but this chamber combined with a heating furnace is also possible, and other configurational parts of conventional heating devices may be broadly used. Moreover, in this example, an element with a frit, which has already provided prior to fusion such that purge gas could circulated inside, was placed on a tray and put in the chamber, but by using a robotic hand or the like for assembly during the sealing process, of course it is possible to conduct fusing without providing this kind of frit in advance. The order of the manufacturing process of the present embodiment at least comprises: a step S1 of producing a thermosensitive element in which a frit such as glass or a glaze is film coated on the sealing part; furnace setup step S2 of placing elements prior to heating and sealing on the tray 4, inserting the tray 4 into the quartz chamber 2 provided in the interior of the furnace, and sealing the chamber 2; a gas enclosing step S3 of enclosing a purge gas containing inert gas and oxygen in the chamber 2 within the furnace; a temperature-raising step S4 of raising the internal temperature of the chamber 2 to the temperature region in which the platinum is in reduced form at a partial pressure of the oxygen in the aforementioned purge gas as determined by the platinum oxide formation free energy; a gas substitution step 5 of substituting the purge gas with inert gas in which oxygen is 1 kPa or less; and a frit fusion step 6 of rapidly heating the interior of the furnace (inside the chamber 2) in this gas substituted state to the frit fusion temperature using the lamp heating devices 6, and sealing the seal part of the thermosensitive part. The present embodiment is thereby capable of being stably used in the temperature region in which the platinum is in reduced form at a oxygen partial pressure of 1 kPa or less as determined by the platinum oxide formation free energy.

A suitable amount of oxygen is included in the purge gas from the gas enclosing step S3 to the temperature-raising step S4 in order to oxidize and remove impurities adhering to the various parts of the element such as the support member and the substrate, and adhering to the surface of the platinum resistance wire in particular. For this amount of oxygen, the oxygen partial pressure is adjusted using the oxygen potential phase chart such that during the temperature raising step S4 of raising the temperature to the temperature of the reduced form, the temperature is kept to one at which the frit or glaze does not melt. In the temperature-raising step S4, the temperature is raised to the Pt reduction temperature region based on the previously described oxygen partial pressure of the purge gas that has been enclosed in the chamber 2 inside the furnace and on the aforementioned platinum oxide formation free energy as determined by the platinum potential phase chart. As the aforementioned impurities are removed under a clean high temperature atmosphere containing oxygen, oxygen is removed and reduced from the oxides on the surface of the platinum resistance wire or platinum resistance film, which is turned into clear platinum wire. At the same time, the resistance ratio of the platinum resistance wire or platinum resistance film is raised based on the effect as residual strain relief annealing of the platinum resistance wire, which is conducted in order to increase the so-called "purity" of the platinum wire or platinum resistance film. The steps from the gas enclosing step S3 to the temperature-raising step S4 may be repeated multiple times. Moreover, a more preferable embodiment conducts pre-processing by repeatedly conducting annealing and gas substitution at a lower temperature at a stage prior to the gas enclosing step S3 for the temperature-raising step S4.

Then, after the temperature-raising step S4 is completed, the purge gas for final enclosure is substituted at the gas substitution step S5, and in the present invention, this purge gas remains inside when sealing the thermosensitive part in the frit fusing step S6 while keeping the oxygen partial pressure at 1 kPa or less. A platinum temperature-measuring resistance element can thereby be obtained with less resistance value variation and high reproducibility even when used in both the oxidation and reduction temperature ranges. The oxygen partial pressure is preferably set to a trace amount, concretely, to 10 Pa or less, more preferably to 1 Pa or less, and even more preferably to 0.1 Pa or less; most desirably, the oxygen partial pressure is set to an oxygen concentration of roughly 0% obtained by passing the specified highly pure inert gas though an oxygen getter.

Next, the process for manufacturing a platinum temperature-measuring resistance element related to another embodiment will be explained based on FIG. 12 and FIG. 14.

This embodiment will be explained using the chamber mount heating furnace 1 as in the embodiment above. The order of the manufacturing process of the present embodiment at least comprises: a step S1 of producing a thermosensitive element in which a frit such as glass or a glaze is film coated on the sealing part; furnace setup step S2 of placing elements prior to heating and sealing on the tray 4, inserting the tray 4 into the quartz chamber 2 provided in the interior of the furnace, and sealing the chamber 2; a gas enclosing step S3 of enclosing a purge gas containing inert gas and oxygen in the chamber 2 within the furnace; a temperature-raising step S4 of raising the internal temperature of the chamber 2 to the temperature region in which the platinum is in reduced form at a partial pressure of the oxygen in the aforementioned purge gas as determined by the platinum oxide formation free energy; a gas substitution step 5 of substituting the purge gas with inert gas in which oxygen is 1 kPa or less; a temperature lowering step S6 of lowering the temperature inside the furnace with the substituted purge gas to the temperature region of the oxidized form of $PtO_2$ in which the partial pressure of the oxygen in the aforementioned substituted gas is 1 kPa or less as determined by the platinum oxide formation free energy; an oxidation step S7 of causing $PtO_2$ oxidation on the surface of the platinum resistance wire or platinum resistance film based on the substituted gas in the furnace in this state containing oxygen; a gas adjusting step S8 of substituting the substituted gas in the furnace with a gas having an oxygen partial pressure such that the use temperature region of the applicable platinum temperature-measuring resistance element 1 falls within the temperature region of aforementioned oxidized form of $PtO_2$; and a frit fusion step 9 of rapidly heating the interior of the furnace (inside the chamber 2) in this gas substituted state to the frit fusion temperature using the lamp heating devices 6, and sealing the seal part of the thermosensitive part. The final adjusted gas remains on the support member and substrate of the thermosensitive part, and the element can be stably used in the use temperature region of the aforementioned oxidized form of $PtO_2$.

In the present the embodiment, in the same way as in the above embodiment, an order was adopted in which, after the purity is increased by raising the temperature to the reduction region in a gas atmosphere containing oxygen, eliminating the impurities adhering to the platinum wire or platinum resistance film, and reducing the PtO, etc. on the surface and conducting residual strain relief annealing, the temperature is decreased to the $PtO_2$ region in a form with the oxygen partial pressure set low in order as much as possible not to produce PtO on the surface of the platinum wire or platinum resistance film in the PtO region, through which the process passes when lowering the temperature to the $PtO_2$ region. Concretely, at the gas substitution step S5 after raising the temperature, the purge gas is substituted with gas with a low oxygen content in which the oxygen partial pressure is 1 kPa or less, and the temperature is lowered in that state. With the oxygen partial pressure as low as possible at this time, it is possible to pass rapidly through the PtO region, and the oxygen partial pressure is preferably set to a trace amount, concretely, to 10 Pa or less, more preferably to 1 Pa or less, and even more preferably to 0.1 Pa or less; most desirably, the oxygen partial pressure is set to an oxygen concentration of roughly 0% obtained by passing the specified highly pure inert gas though an oxygen getter.

In the temperature lowering step S6, the $PtO_2$ region is determined by the platinum oxidation potential phase chart based on the oxygen partial pressure of the previously described low oxygen content gas that was replaced and on the oxide formation free energy, and preferably cooling is conducted such that the temperature lowering rate is rapid allowing quicker passage through the PtO region. Then in the oxidation step S7, with the temperature lowered to the $PtO_2$ region, high oxygen concentration purge gas is substituted and the surface of the platinum wire is allowed to sufficiently oxidize, and preferably the gas used at that time has an oxygen concentration of nearly 100%.

Then, in the final gas adjustment step S8 prior to sealing, as opposed to the aforementioned embodiment, the oxygen partial pressure in the purge gas in the furnace (in the chamber) is not set to 1 kPa or less, but rather it is necessary to set the oxygen partial pressure of the purge gas to greater than 1 kPa in order to make a partial pressure such that the use temperature region falls within the aforementioned $PtO_2$ region (does not change form to PtO). For example, if making the use region a temperature region from low temperature to near 300° C., the oxygen partial pressure as determined from the platinum oxidation potential phase chart indicated in FIG. 1 is adjusted to about 10 kPa or more.

Further, in this example, a description was given of providing a frit to seal the thermosensitive part in the fusion step S9, but with configurations for use in the $PtO_2$ region after causing sufficient oxidation, as in this second embodiment, it is not always necessary to seal the thermosensitive part. In platinum resistance thermometer in which a platinum temperature-measuring resistance element having an unsealed thermosensitive part mounted in a protective tube, if the oxygen partial pressure of the gas to be purged in the protective tube is set the same as the oxygen partial pressure of the final adjustment gas (S8) as described above, then a platinum temperature-measuring resistance element can be offered that can be stably used in the use temperature region that fits in the $PtO_2$ region.

An embodiment of the present invention was described above, but the present invention is not at all limited by this embodiment, and of course a variety of forms that are within the range that does not deviate from the intention of the present invention may be implemented.

EXAMPLES

Experiment 1

In order to study the characteristics of the platinum temperature-measuring resistance element produced according to the manufacturing process of the embodiment above, experiments investigating the oxidation-reduction characteristics in the high temperature region considered by the present invention were conducted using the platinum resistance thermometer indicated in FIG. 13 in which a thermosensitive part was mounted into the protective tube without sealing. Each of the experiments 1 to 3 below were conducted using the platinum resistance thermometer in FIG. 13, differing only by whether the thermosensitive part was first sealed by a frit or glaze, or whether an unsealed thermosensitive part was sealed inside a protective tube. It could be anticipated that the characteristics of the elements would indicate the same trends, and cold be used interchangeably as reference examples. The platinum resistance thermometer 101 in FIG. 13 is a conventional, well-known thermometer that is configured by a thermosensitive part 102, in which a single coil is formed by winding straight platinum resistance wire 120 in a coil shape on a cross-shaped reel 104; the thermosensitive part is inserted in a protective tube 103, the interior of which is purged with purge gas G and then sealed. The oxygen partial pressure of Example 1 was a trace amount of approximately 0.1 Pa, and the oxygen partial pressure of Comparative Example 1 was 4 kPa at room temperature. The reduction and annealing prior to gas substitution was conducted at a temperature of 670° C. for 10 hours. In Example 1 highly pure argon (oxygen partial pressure of approximately 0.1 Pa) was substituted as the purge gas, and Comparative Example 1 was adjusted such that the oxygen partial pressure was 4 kPa at room temperature, and such that together with argon the total pressure was approximately 100 kPa or less at 900° C. and approximately 25 kPa at room temperature.

Figure 4:
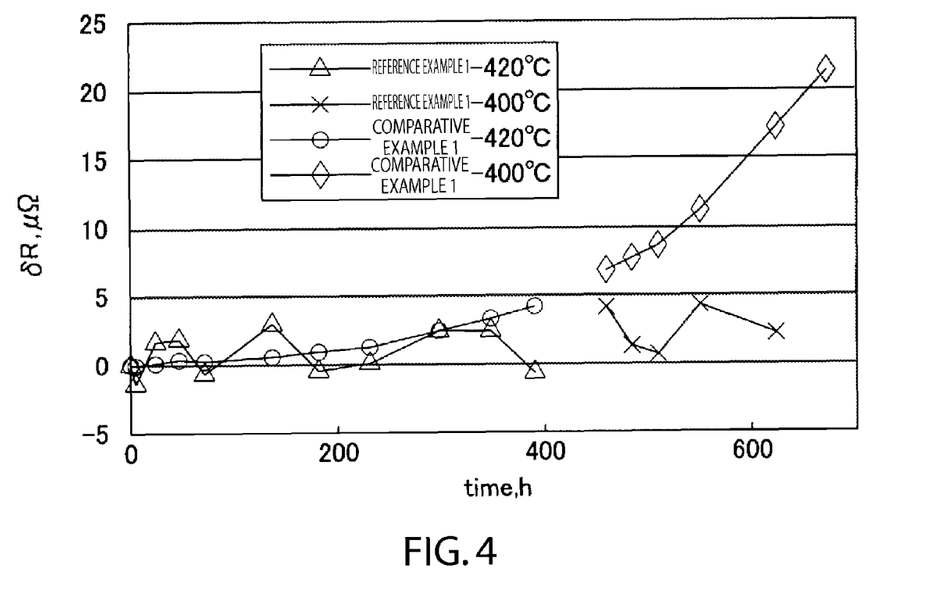
FIG. 4 is a graph indicating the results of measuring the resistance values while maintaining Reference Example 1 and Comparative Example 1 at 420° C. for 100 hours or more, and at 400° C. for 100 hours or more.

First, the platinum resistance thermometers were maintained at 420° C. for 100 hours or more, and at 400° C. for 100 hours or more, and periodically were cooled to room temperature to measure the resistance values of temperatures at the triple point of water. The measurement results are indicated in FIG. 4. In Comparative Example 1 (4 kPa), there was an increase of resistance value in conjunction with the time of exposure at 420° C. and 400° C. As is evident from the oxidation potential phase chart in FIG. 1, $\Delta G_{PtO}(T,p)$ is negative in this temperature region, and the $O_2$ in the sheath is consumed and PtO spreads into the platinum wire. Meanwhile, in Example 1 (approximately 0.1 Pa), the resistance values at 420° C. and 400° C. were within about 1 mK and were maintained at a constant level. At the oxygen partial pressure of approximately 0.1 Pa, the $\Delta G_{PtO}$ and the $\Delta G_{PtO2}$ are both positive at 420° C. and 400° C., and the platinum wire does not oxidize. The different results of these two platinum resistance thermometers indicate that the oxygen partial pressure in the sheath greatly contributes to the variations of resistance value, and demonstrate that an oxygen partial pressure of approximately 0.1 Pa is extremely stable in relation to oxidation, and is suitable for precision measurements in the temperature region of 400° C. or more.

Figure 5:
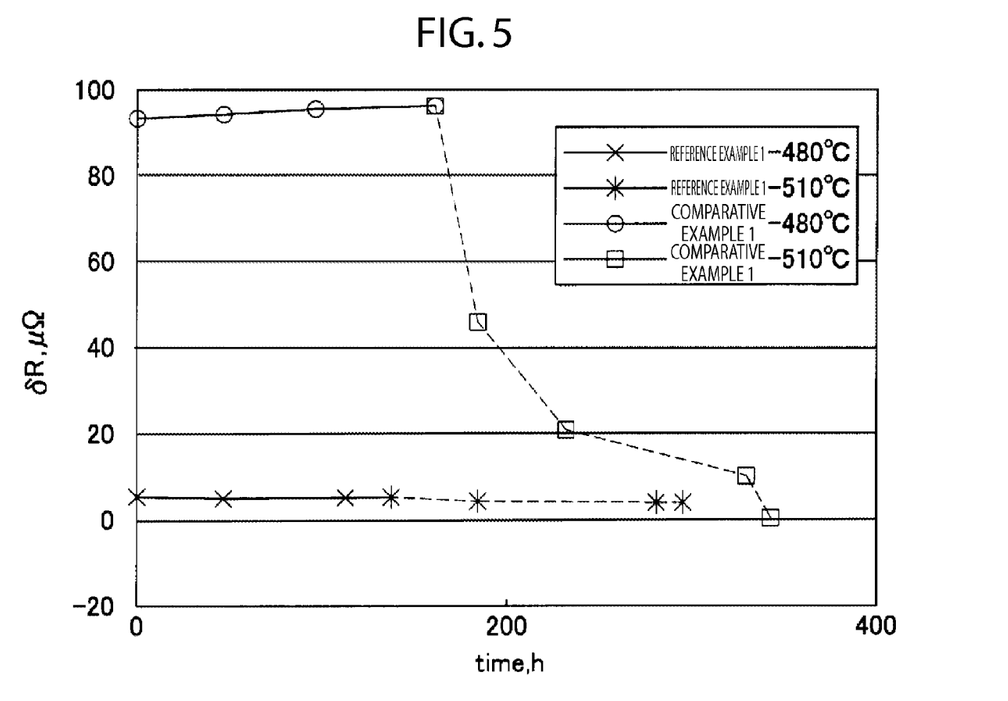
FIG. 5 is a graph indicating the results of measuring the resistance values after using Reference Example 1 and Comparative Example 1 for 1000 hours or more in the temperature region of 230 to 420° C., and then causing isothermal reduction at 480° C. and 510° C.

Next, after measuring the aforementioned resistance values of oxidation characteristics, and after having used Example 1 (approximately 0.1 Pa) and Comparative Example 1 (4 kPa) for 1000 hours or more in the 230 to 420° C. temperature range, isothermic reduction was measured at 480° C. and 510° C. The results of isothermic reduction are indicated in FIG. 5. In Comparative Example 1, in the oxidation potential phase chart the $\Delta G_{PtO}(T)$ at 480° C. nearly traverses the line $\Delta G_{PtO}(T)=0$, the resistance value is nearly constant as indicated in FIG. 5, and PtO and Pt are in equilibrium. However, at 510° C., $\Delta G_{PtO}(T)$ becomes >0, and it is clear that reduction of PtO causes a rapid decrease in resistance value. Meanwhile, the resistance value of Example 1 is constant at 480° C. and 510° C. The results of Experiment 1 above demonstrate that there are large resistance value variations caused by oxidation and reduction in the platinum resistance thermometer in which the oxygen partial pressure is 4 kPa, but the platinum resistance thermometer with the low oxygen partial pressure of approximately 0.1 Pa is stable at any temperature. This demonstrates that, in the same way as with the platinum resistance thermometer related to the present invention, an element capable of being stably used in a broad temperature region can be manufactured by raising the temperature to the reduced form prior to sealing the thermosensitive part with sealing material, and afterwards sealing in a gas atmosphere having a low oxygen partial pressure.

Experiment 2

Figure 6:
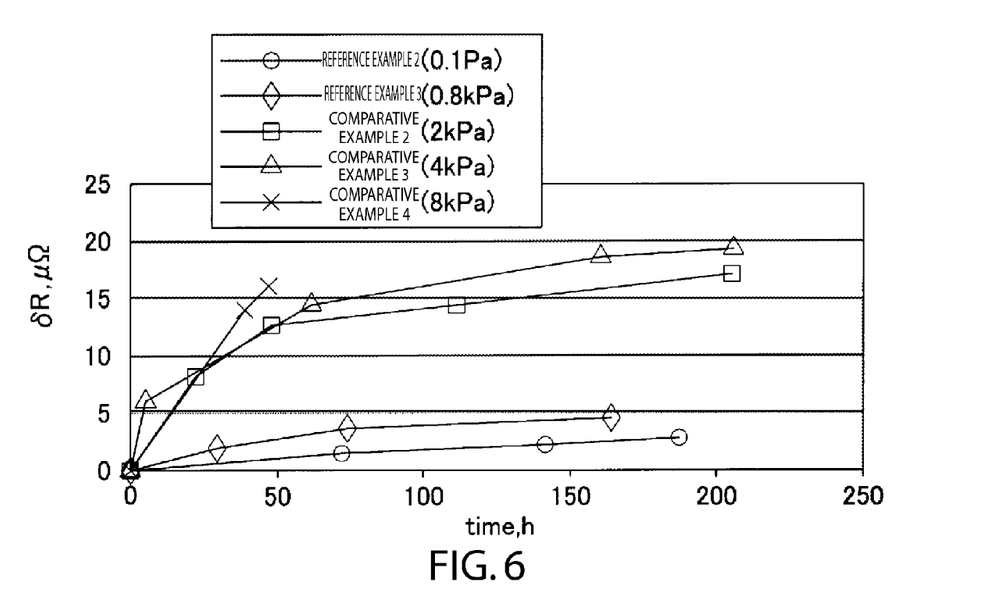
FIG. 6 is a graph indicating the results of measuring resistance value variations of Reference Examples 2, 3 and Comparative Examples 2 to 4 at 230° C.

Next, an experiment was conducted to investigate the isothermic oxidation characteristics using example and comparative platinum resistance thermometers manufactured set to multiple and more detailed final adjustments of the oxygen partial pressures. Using 5 types of platinum resistance thermometer with differing oxygen partial pressures, Example 2 (approximately 0.1 Pa), Example 3 (0.8 kPa), Comparative Example 2 (2 kPa), Comparative Example 3 (4 kPa), and comparative Example 4 (8 kPa), reduction and annealing prior to the respective gas substitutions was conducted at a temperature of 670° C. for 10 hours. The numeric values in parentheses of the various platinum resistance thermometers are the respective oxygen partial pressures at room temperature. FIG. 6 indicates the results of measuring the resistance value variations of the platinum resistance thermometers at 230° C., and FIG. 7 indicates the results of measuring the resistance value variations of the platinum resistance thermometers (except for Comparative Example 4) at 420° C.

Figure 7:
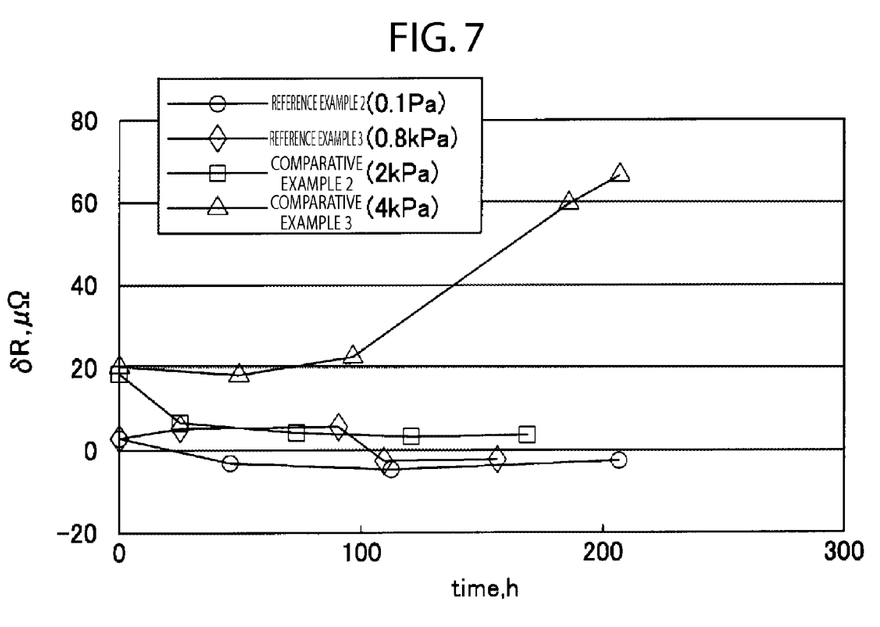
FIG. 7 is a graph indicating the results of measuring resistance value variations of Reference Examples 2, 3 and Comparative Examples 2, 3 at 420° C.

As indicated in FIG. 6, in low oxygen partial pressures such as Example 2 (approximately 0.1 Pa) and Example 3 (0.8 kPa) drift at 230° C. was comparatively small, but Comparative example 2 (2 kPa), Comparative Example 3 (4 kPa) and Comparative Example 4 (8 kPa) were not stable even at the low temperature of 230° C. Specifically, Comparative Example 3 (4 kPa) and Comparative Example 4 (8 kPa) exhibited large resistance variations of 60 mK or more. Meanwhile, as indicated in FIG. 7, it was demonstrated that low oxygen partial pressures such as Example 2 (approximately 0.1 Pa) and Example 3 (0.8 kPa) were stable even at 420° C. Comparative Example 2 (2 kPa) was comparatively stable at 420° C., but resistance value drift was observed at 230° C. This fact indicates that the oxygen partial pressure is extremely sensitive to oxidation. This demonstrates that the oxygen partial pressure must be adjusted according to the temperature region to be used, and that a platinum resistance thermometer capable of all temperature ranges must adjusted to a low oxygen partial pressure of 1 kPa or less. As demonstrated by Experiments 1 and 2, inasmuch as resistance value drift of platinum resistance thermometers depends on the chemical reactions of $PtO_2$ and PtO, which are controlled by the oxide formation free energy, platinum resistance thermometers with a high oxygen partial pressure indicate large resistance value variations when used at 400° C. or more. Meanwhile, platinum resistance thermometers with a low oxygen partial pressure, for example 1 kPa or less, are stable in relation to oxidation as long as the platinum wire is not contaminated. In conclusion, the oxygen in the sheath should be lower than 1 kPa, and if used in a broad temperature region, preferably should be conducted by reduction to the reduction region of 600° C. or more for every measurement.

Experiment 3

Figure 8:
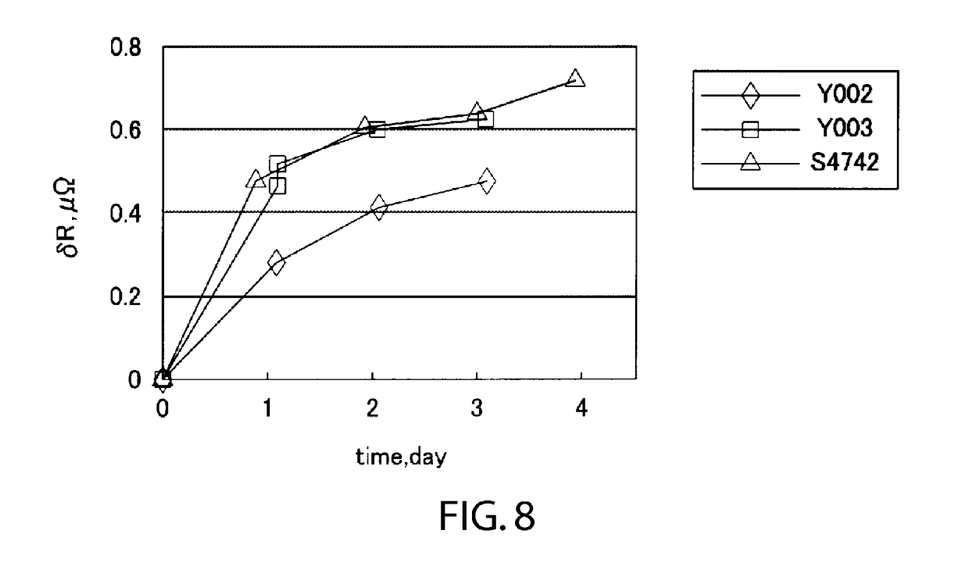
FIG. 8 is a graph indicating the results of measuring resistance value variations of platinum resistance thermometers at 100° C.
Figure 9:
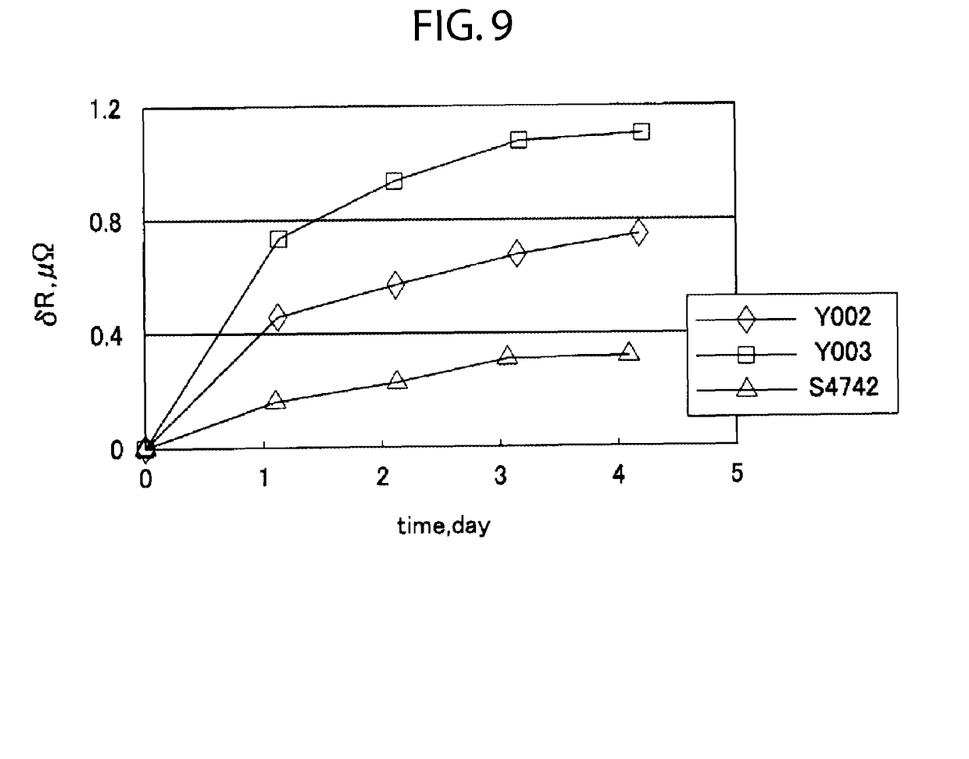
FIG. 9 is a graph indicating the results of measuring resistance value variations of platinum resistance thermometers at 150° C.

Next, an experiment was conducted regarding stability based on sufficient oxidation in order to study the characteristics of a platinum temperature-measuring resistance element produced by the manufacturing process of the second embodiment above. First, after an experiment was conducted to investigate the oxidation characteristics in the low temperature region using three types of platinum resistance thermometers, Y002 (2 kPa), Y003 (2 kPa), and S4742 (8 kPa), and then reducing each at 650° C. for approximately 15 hours, the temperature was maintained at 100° C. and 150° C. for 3 to 4 days. The resistance values of the platinum resistance thermometers were periodically measured at the triple point of water. FIG. 8 indicates the results of measuring the resistance value variations of the platinum resistance thermometers at 100° C., and FIG. 9 indicates the results of measuring the resistance value variations of the platinum resistance thermometers at 50° C. The resistance values indicated gradual drift following the $PtO_2$ curve in FIG. 1. It may be inferred from these resistance value variations that several layers of oxidized platinum were on the surface of the platinum wire. However, the resistance values continually increased, and the oxidation layers expanded.

Figure 10:
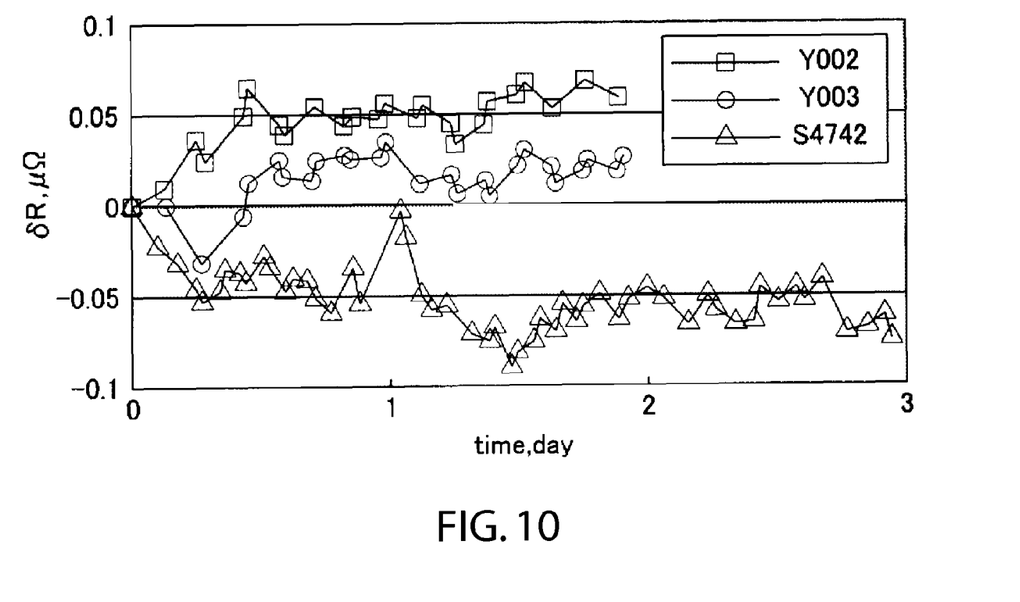
FIG. 10 is a graph indicating the results of maintaining platinum resistance thermometers at 420° C. for approximately 15 hours, afterwards cooling in order to cause full oxidation of the platinum wire, and then measuring resistance values.

According to the oxidation potential phase diagram, resistance value drift of the platinum resistance thermometers caused by oxidation of platinum cannot be avoided, but drift caused by oxidation is not that rapid at room temperature. If the platinum resistance thermometer can be controlled to a given oxidation state, then stability could probably be guaranteed over a long period in a limited temperature use region. From this perspective, the stability of sufficiently oxidized platinum wire was measured. The results are indicated in FIG. 10. In this experiment, the aforementioned three platinum resistance thermometers were maintained at 420° C. for approximately 15 hours, and afterwards were slowly cooled at a rate of about −20° C./h in order to cause sufficient oxidation of the platinum wire. Next, the resistance values at the triple point of water were measured. Drift was observed for the first several hours, but afterwards the resistance stabilized. The results of Experiment 3 demonstrate that platinum wire that has been sufficiently oxidized is comparatively stable, and if in the aforementioned $PtO_2$ oxidized form in the temperature region of use, the platinum resistance thermometer can be stably used even at a partial pressure of 1 kPa or more. Therefore, this demonstrates that a platinum temperature-measuring resistance element related to the present invention can be stably used by allowing the thermosensitive part prior to sealing with sealing material to undergo sufficient oxidation with $PtO_2$ in the furnace or in the chamber, and sealing based on a gas atmosphere with a partial pressure that maintains that form.

The invention claimed is:

1. A process for manufacturing a platinum temperature-measuring resistance element configured by sealing with a sealing material a thermosensitive part composed of platinum resistance wire or platinum resistance film, comprising the steps of:
    raising a temperature of an unsealed thermosensitive part composed of platinum resistance wire or platinum resistance film inside a furnace;
    purging the furnace with inert gas containing oxygen to a temperature region in which the platinum is in reduced form at a partial pressure of oxygen in an applicable purge gas as determined from platinum oxide formation free energy;
    substituting the purge gas in the furnace with inert gas in which oxygen is 1 kPa or less; and
    sealing the thermosensitive part in the inert gas, wherein the thermosensitive part can be stably used to the temperature region of the reduced form of platinum in which the partial pressure of the oxygen is 1 kPa or less as determined by the platinum oxide formation free energy, and
    wherein an oxygen partial pressure of the purge gas is the partial pressure at room temperature.

2. The process for manufacturing a platinum temperature-measuring resistance element according to claim 1 wherein said temperature region of platinum in reduced form and a temperature region in $PtO_2$ form are determined by the platinum oxidation potential phase chart based on the respective oxide formation free energies.

3. The process for manufacturing a platinum temperature-measuring resistance element according to claim 1 wherein said inert gas with oxygen of 1 kPa or less that is substituted in the furnace is an inert gas with roughly 0% or trace amounts of oxygen.

4. The process for manufacturing a platinum temperature-measuring resistance element according to claim 3 wherein a substance obtained by passing a specified highly pure inert gas through an oxygen getter is used as said inert gas in which oxygen is roughly 0%.

5. The process for manufacturing a platinum temperature-measuring resistance element according to claim 4 wherein said temperature region of platinum in reduced form and a temperature region in PtO2 form are determined by the platinum oxidation potential phase chart based on the respective oxide formation free energies.

6. A process for manufacturing a platinum temperature-measuring resistance element having a thermosensitive part composed of platinum resistance wire or platinum resistance film comprising the steps of:

raising a temperature of the thermosensitive part inside a furnace;

purging the furnace with inert gas containing oxygen to a temperature region in which the platinum is in reduced form at a partial pressure of oxygen in an applicable purge gas as determined from platinum oxide formation free energy;

substituting the purge gas in the furnace with inert gas in which oxygen is 1 kPa or less; and in the presence of the inert gas, decreasing the temperature inside the furnace to the temperature region in which $PtO_2$ is in oxidized form at a partial pressure of oxygen in the purge gas of 1 kPa or less, gas containing oxygen is taken as the purge gas in the furnace and the surface of the platinum resistance wire or platinum resistance film of said thermosensitive part is sufficiently oxidized with $PtO_2$.

7. The process for manufacturing a platinum temperature-measuring resistance element according to claim 6 that can be stably used in the temperature region of said $PtO_2$ oxidized form further comprising the steps of allowing the surface of the platinum resistance wire or platinum resistance film of said thermosensitive part to undergo sufficient oxidation with $PtO_2$, sealing said thermosensitive part when the purge gas in the furnace is further substituted with gas having a oxygen partial pressure such that the use temperature region of the applicable platinum temperature-measuring resistance element falls within the temperature region of said oxidized form of $PtO_2$.

8. The process for manufacturing a platinum temperature-measuring resistance element according to claim 6 wherein the gas containing oxygen is a gas of 100% oxygen in order to cause $PtO_2$ oxidation on the surface of the platinum resistance wire or platinum resistance film of said thermosensitive part.

9. A process for manufacturing a platinum temperature-measuring resistance element comprises the step of preparing a thermosensitive part having a portion to be sealed coated with a glaze; the step of placing a pre-sealing element on a tray and inserting the same in a chamber; the step of enclosing a purge gas containing an inert gas and oxygen in the chamber; the step of raising the internal temperature of the chamber to a region in which the platinum is in reduced form at a partial pressure of oxygen in the purge gas as determined from platinum oxide formation free energy; the step of replacing the purge gas with an inert gas wherein oxygen is 1 kPa or below; and the step of rapidly heating the interior of the chamber to a frit melting temperature by means of a lamp heating unit to thereby seal the portion to be sealed of the thermosensitive part.

* * * * *